(12) United States Patent
Takahashi et al.

(10) Patent No.: US 7,825,799 B2
(45) Date of Patent: Nov. 2, 2010

(54) METHOD AND APPARATUS FOR MONITORING POWER SUPPLY FAILURE

(75) Inventors: Hideaki Takahashi, Odawara (JP); Manabu Yamagata, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 771 days.

(21) Appl. No.: 11/634,069

(22) Filed: Dec. 6, 2006

(65) Prior Publication Data

US 2008/0082849 A1 Apr. 3, 2008

(30) Foreign Application Priority Data

Sep. 29, 2006 (JP) ............... 2006-267218

(51) Int. Cl.
*G08B 21/00* (2006.01)
(52) U.S. Cl. .................. 340/540; 320/116
(58) Field of Classification Search ........... 340/540, 340/636.1, 636.17, 636.19; 320/116
See application file for complete search history.

(56) References Cited

U.S. PATENT DOCUMENTS

| | | | | |
|---|---|---|---|---|
| 5,254,930 A | * | 10/1993 | Daly .................. | 320/119 |
| 5,611,380 A | * | 3/1997 | Landy ................. | 160/76 |
| 5,652,498 A | * | 7/1997 | Edye et al. ............. | 702/63 |
| 5,661,380 A | * | 8/1997 | Obara et al. ........... | 318/139 |
| 6,020,717 A | * | 2/2000 | Kadouchi et al. ........ | 320/116 |
| 6,094,031 A | * | 7/2000 | Shimane et al. ......... | 320/118 |
| 6,281,684 B1 | * | 8/2001 | James ................. | 324/434 |
| 6,621,247 B1 | * | 9/2003 | Bulling et al. .......... | 320/116 |
| 7,486,050 B2 | * | 2/2009 | Hidaka et al. .......... | 320/134 |
| 2006/0028179 A1 | * | 2/2006 | Yudahira et al. ........ | 320/133 |

FOREIGN PATENT DOCUMENTS

| | | |
|---|---|---|
| JP | 6-133007 | 10/1992 |
| JP | 7-7868 | 6/1993 |

* cited by examiner

*Primary Examiner*—George A Bugg
*Assistant Examiner*—Edny Labbees
(74) *Attorney, Agent, or Firm*—Hitachi America, Ltd.

(57) ABSTRACT

An object of the invention is to render replacement of controllers for identifying failure information unnecessary. Failure monitor units 24 and 26 in power supplies 10 and 12 are connected mutually via paths 38 and 40, the failure monitor units 24 and 26 in the power supplies 10 and 12 are connected to failure monitor units 30 and 32 in controllers 14 and 16 via paths 34 and 36, and LEDs 1 and 2 are connected to paths 34 and 36. The failure monitor unit 24 transfers, when a failure occurs in the power supply 10, failure information to the failure monitor unit 26 in the power supply 12 via the path 38. The LED 1 is lit by both the failure monitor units 24 and 26. The failure monitor units 24 and 26 transfer failure information indicating failure occurrence in the power supply 10 to the failure monitor units 30 and 32 in controllers 14 and 16 via a path 34. The failure monitor units 30 and 32 notify a maintenance PC of the failure occurrence in the power supply 10.

5 Claims, 12 Drawing Sheets

| # | FAILURE PATTERN | | | CONVENTIONAL TECHNIQUE | NEW TECHNIQUE |
|---|---|---|---|---|---|
| 1 | FAILURE CONCERNING PSALARM SIGNAL RECEPTION | DETECT PSALARM SIGNAL ALTHOUGH PSALARM SIGNAL HAS NOT BEEN SENT (PSALARM SIGNAL MISDETECTION) | SEND NOTICE TO HOST | POSSIBLE | ↓ |
| | | | RECOVERY OPERATION | REPLACE PS→REPLACE CTL →RECOVER | REPLACE PS→REPLACE OTHER PSs →RECOVER |
| 2 | | NOT DETECT PSALARM SIGNAL ALTHOUGH PSALARM SIGNAL HAS BEEN SENT | SEND NOTICE TO HOST | POSSIBLE IF EITHER CTL #1/#2 DETECTS FAILURE | POSSIBLE IF EITHER CTL #1/#2 DETECTS FAILURE |
| | | | RECOVERY OPERATION | REPLACE PS→RECOVER | ↓ |
| 3 | FAILURE CONCERNING ALARMLED SIGNAL RECEPTION | SEND ALARMLED SIGNAL ALTHOUGH LED DOES NOT HAVE TO BE LIT (ALARMLED SIGNAL MISSENDING) | SEND NOTICE TO HOST | IMPOSSIBLE | POSSIBLE |
| | | | RECOVERY OPERATION | REPLACE PS→REPLACE CTL →RECOVER | REPLACE PS→REPLACE OTHER PSs →RECOVER |
| 4 | | NOT SEND ALARMLED SIGNAL ALTHOUGH LED HAS TO BE LIT | SEND NOTICE TO HOST | POSSIBLE IF EITHER CTL #1/#2 DETECTS FAILURE | POSSIBLE IF EITHER CTL #1/#2 DETECTS FAILURE |
| | | | RECOVERY OPERATION | REPLACE PS→RECOVER | ↓ |

METHOD AND APPARATUS FOR MONITORING POWER SUPPLY FAILURE

CROSS-REFERENCES TO RELATED APPLICATIONS

This application relates to and claims priority from Japanese Patent Application No. 2006-267218, filed on Sep. 29, 2006, the entire disclosure of which is incorporated herein by reference.

BACKGROUND

1. Field of the Invention

The invention relates to a technique provided for storage systems or network systems connected to a communication network, the technique being one for monitoring the status of redundant power supplies, collecting failure information from each power supply, and transmitting the collected failure information to a monitoring source, such as a host computer, via a communication network.

2. Description of Related Art

A communication system in which each functional block has a power supply and is connected to a controller via a system bus is well known (see JP-7-7868). While failures that occur in each power supply are monitored in each functional block in that communication system, power supply failure information generated from the power supply in which a failure has occurred is detected by a detection means, power supply failure detection information is generated, the generated power supply failure detection information is transferred to the controller via a bus interface means and a bus for notifying failure information, and the controller identifies in which functional block the power supply failure has occurred. With that configuration, measures for early recovery can be taken by promptly giving an order to fix the functional block to a maintenance person.

An apparatus that gives notification of failure occurrence with lamp lighting when a power supply failure has occurred has also been proposed (see JP-A-6-133007). While power supply failures are monitored in that apparatus, information about power supply failure in a power supply is collected, the collected failure information is transferred to a monitoring package to output an order to light a lamp from the monitoring package, and power is supplied from a power supply in the monitoring package to a lamp to light the lamp. In other words, to prevent the situation where power is not supplied and the lamp is not lit because of power supply failure, power for the lamp in the power supply is supplied from a power supply in the monitoring package, which is different from the main power supply.

A currently attempted technique for storage systems is one where power is supplied to the disks from redundant power supplies, a failure monitor unit for monitoring the status of each power supply, collecting failure information from the power supply, and transferring the collected failure information to controllers is provided to each power supply, and, if a failure has occurred in any of the power supplies, an order to light a LED provided to the power supply in which the failure has occurred is output and the failure information is transferred to a host computer or a failure monitoring center via a communication network from the failure monitor unit in each controller.

If, in order to transmit power supply failure information to a monitoring source such as a host computer via a communication network, a failure monitor unit for collecting power supply failure information and a LED that lights when a failure has occurred are provided to each power supply; a failure monitor unit for identifying the failure information output from the failure monitor unit in each power supply is provided to each controller; and the identification result is transmitted from the failure monitor unit in the controller to a host computer via the communication network and LED lighting is controlled by the failure monitor unit in the controller, the LED can be lit in case of failure occurrence even if the failure has occurred in the power supply.

However, if a hardware/software failure has occurred in a section that collects power supply failure information or controls the LED in the failure monitor unit in the controller, e.g. if the controller has detected failure information by mistake, the LED does not light, and accordingly the controller has to be replaced. At worst, a user/maintenance person cannot recognize the failure in the controller. The controller is connected to a host computer or a user terminal. Accordingly, if the controller is replaced, all interfaces connected to that controller are blocked out, and so the system, or some sections of the system, may freeze. Moreover, if a redundant controller is not provided, the entire system is forced to stop. Furthermore, hardware/software preparation for the replaced controller for failure information collection and LED control is necessary.

The present invention has been made considering the above described problems in conventional techniques, and an object of the invention is to render replacement of the controller for identifying failure information unnecessary by each power supply monitoring its own status, recognizing the status of other power supplies, and exchanging monitoring results with other power supplies.

SUMMARY

To achieve the object stated above, according to the present invention, when the status of redundant power supplies is monitored by failure monitor circuits, failure information is collected from the respective power supplies;

failure information output from the failure monitor circuits is identified by the controllers, and the identification result in each controller is transmitted to a monitoring source, such as a host computer, via a communication network;

and a failure monitor circuit installed in each power supply monitors the status of the monitor target power supply and also monitors, at the same time, the status of another power supply, transfers failure information collected from the monitor target power supply to the controllers and other failure monitor circuits, and transfers the failure information input from other failure monitor circuits to the controllers. Accordingly, even if a failure has occurred in the failure information collection function or the LED lighting control function, the failure can be recovered from by replacing the power supply, the controllers do not have to be replaced, and system freeze can be avoided. By controlling the lighting of a light emitting element arranged to respond to the failure monitor circuit in each power supply according to failure information collected by its own or other failure monitor circuits, the lighting of the light emitting element provided to the malfunctioning power supply can be controlled with certainty.

According to the present invention, a power supply monitoring method, a power supply monitoring device, and a storage system that can render replacement of a controller that identifies failure information unnecessary by each power supply monitoring its own status, also monitoring the status of other power supplies, and exchanging monitoring results with other power supplies is provided.

Other aspects and advantages of the invention will be apparent from the following description and the appended claims.

BRIEF DESCRIPTION OF THE DRAWINGS

FIG. 1 is a block diagram showing the communication system the invention is applied to.

FIG. 2 is a detailed block diagram showing the communication system the invention is applied to.

FIG. 11 is a block diagram showing the storage system the invention is applied to.

FIG. 12 is a block diagram showing the server the invention is applied to.

DETAILED DESCRIPTION OF PREFERRED EMBODIMENTS

Figure 1:
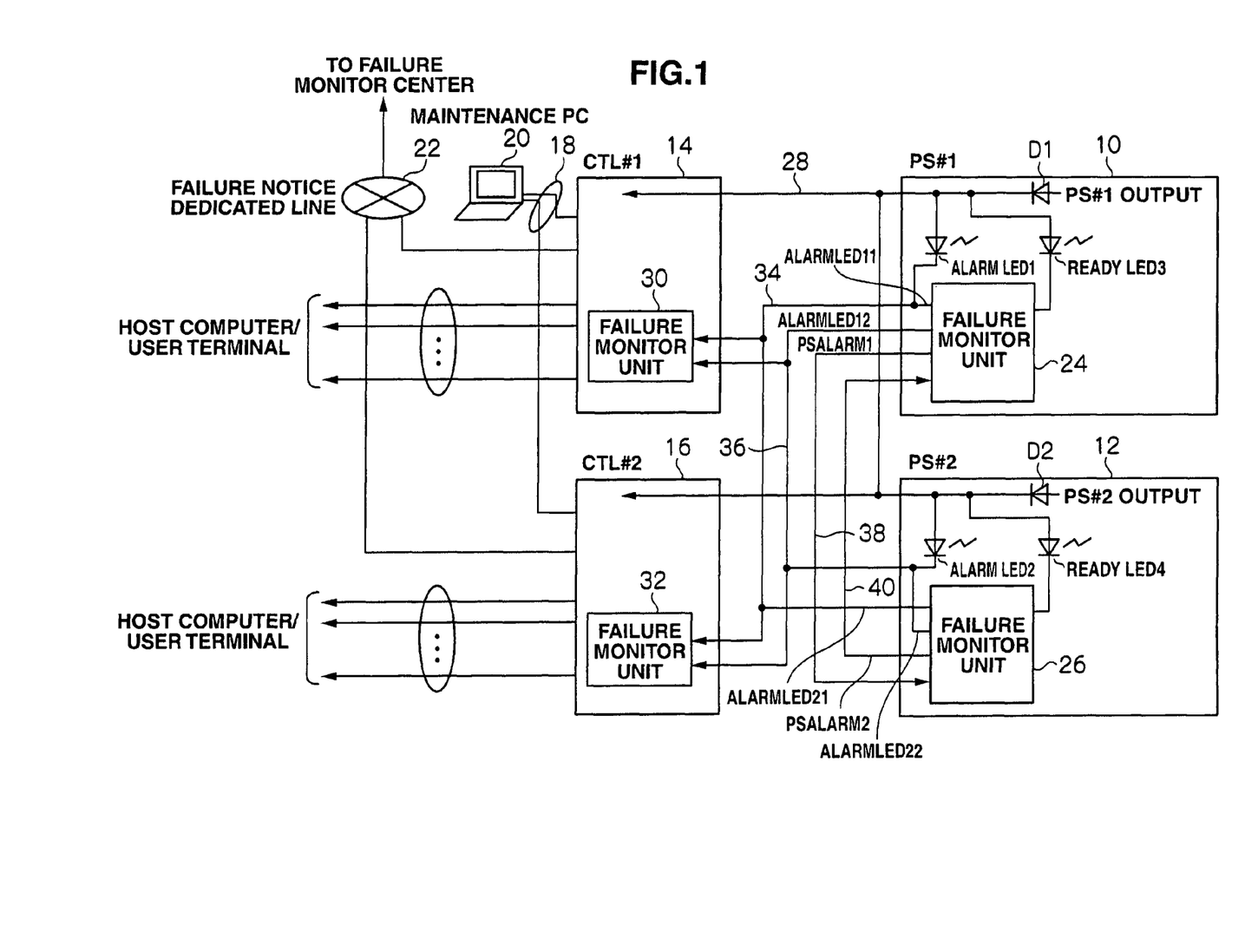

Embodiments according to the present invention will be described with reference to the drawings. FIG. 1 is a block diagram showing a communication system in which a power supply failure monitoring device according to the invention is used. In FIG. 1, the communication system includes a power supply (PS) #1 (10), power supply #2 (12), controller (CTL) #1 (14), and controller #2 (16). The controllers 14 and 16 are installed on a board and connected to a maintenance PC (Personal Computer) 20 via a LAN (Local Area Network), to a failure monitor center via a failure notice dedicated line 22, which is a communication line, and to monitoring sources, such as a host computer and user terminals, via other communication networks.

The power supplies 10 and 12 are redundant. The power supply circuits 10 and 12 respectively include failure monitor units 24 and 26 as failure monitor circuits for monitoring the status of the redundant power supplies 10 and 12, ALARM LEDs 1 and 2 that light during failure occurrence, READY LEDs 3 and 4 that light in the normal status, and diodes D1 and D2 as rectifying devices. The anode side of the diode D1 is connected to power supply output of the power supply 10, the anode side of the diode D2 is connected to the power supply output of the power supply 12, and the cathode sides of the diodes D1 and D2 are connected to a power supply line 28 common to both power supplies. The power supply line 28, being a power supply output line of the redundant power supplies 10 and 12, is connected to the controller 14 and 16 and the anode sides of the LEDs 1-4.

Failure monitor units 30 and 32 for identifying failure information are provided respectively to the controller 14 and 16, and are connected mutually via paths 34 and 36 and also connected to the failure monitor units 24 and 36 in the power supplies 10 and 12. The failure monitor units 24 and 26 in the power supplies 10 and 12 are connected mutually via paths 38 and 40.

The failure monitor unit 24 monitors the status of the power supply 10, collects information about, e.g., excess voltage and eddy current in the power supply as failure information, outputs the collected failure information as an ALARMLED 11 signal to the failure monitor units 30 and 32 via the path 34, makes the LED 1 light with the ALARMLED 11 signal, and outputs the failure information as a PSALARM 1 signal to the failure monitor unit 26 via the path 38. Meanwhile, the failure monitor unit 26 monitors the status of the power supply 12, collects failure information about, e.g., excess voltage and eddy current in the power supply 12, outputs the collected failure information as an ALARMLED 22 signal to the failure monitor units 30 and 32 via the path 36, makes the LED 2 light, and outputs the collected failure information as a PSALRAM 2 signal to the failure monitor unit 24 via the path 40. The failure monitor unit 24 outputs the ALARMLED 12 signal, which is failure information, to the failure monitor units 30 and 32 via the path 36 in response to the failure information input from the path 40, and controls the lighting of the LED 2. The failure monitor 26 outputs, in response to the failure information input from the path 38, that failure information as an ALARMLED 21 signal to the failure monitor units 30 and 32 via the path 34, and controls the lighting of the LED 1 with the ALARMLED 21 signal.

Each of the failure monitor units 30 and 32 in the controllers 14 and 16 identifies the failure information output respectively from the failure monitor units 24 and 26 in the power supplies 10 and 12, and sends the identification result to the maintenance PC 20 and the failure monitor center or a host computer/user terminal.

Figure 2:
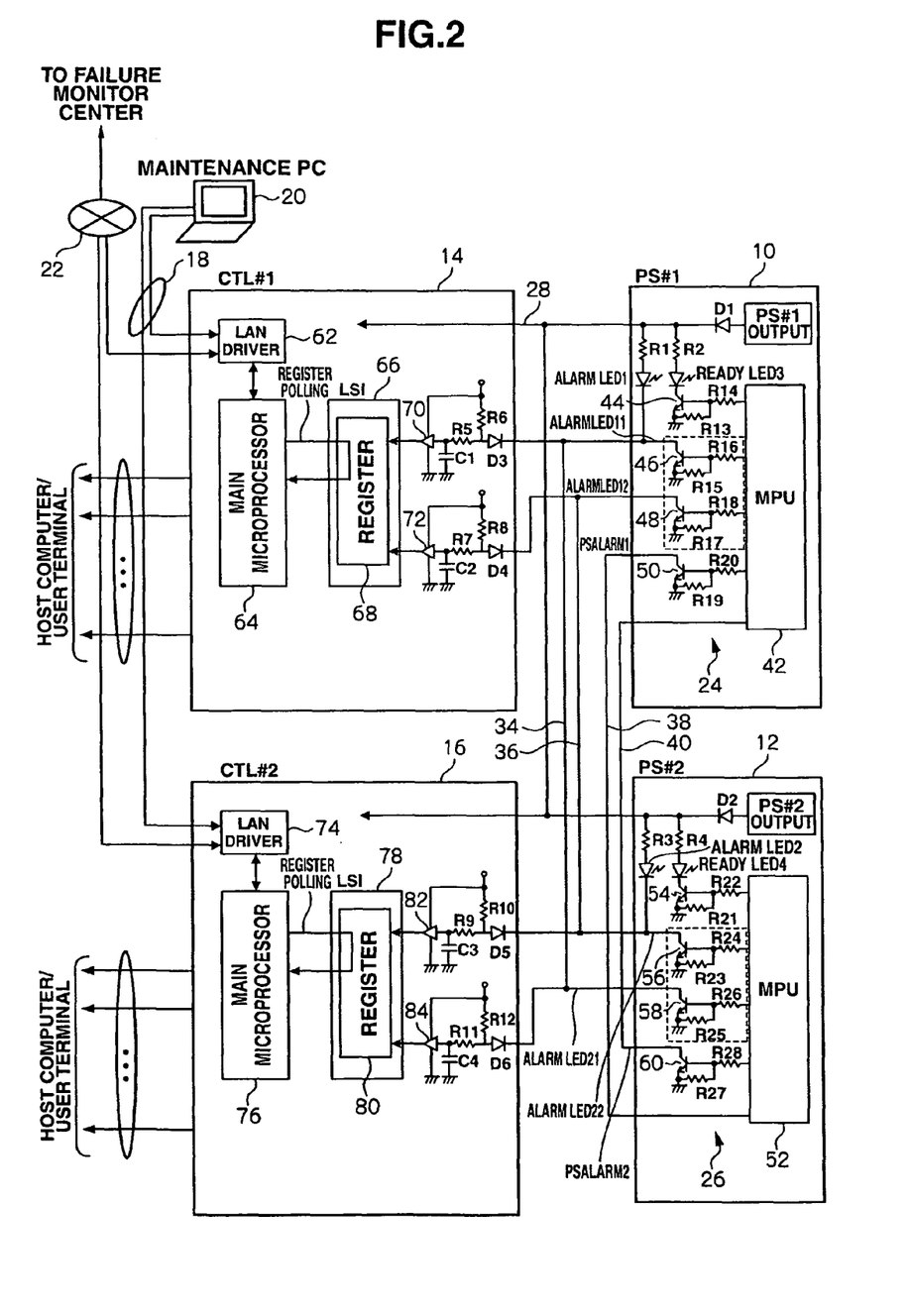

More specifically, as shown in FIG. 2, the failure monitor unit 24 includes an MPU (Microprocessing Unit) 42, NPN transistors 44, 46, 48, and 50, and resistors R13-R20. The MPU 42 normally outputs an "H" level signal from a terminal T11 and an "L" level signal from terminals T12, T13, and T14. Meanwhile, the MPU 42 outputs, as failure information when a failure has occurred in the power supply 10 or 12, an "H" level signal from the terminals T12, T13, and T14. When the level in the terminal T12 becomes "H," the transistor 46 is turned on and the LED 1 lights, and "L" level failure information is output, via the path 34, to the failure monitor units 30 and 32 in the controllers 14 and 16. When the output level of the terminal T12 becomes "H," the output level of the terminal T14 also becomes "H," the transistor 50 is turned on, and an "L" level signal is transferred as failure information to the failure monitor unit 26 in the power supply 12. The output level of the terminal T13 becomes "H" when the failure information indicating the failure occurrence in the power supply 12 is input to the MPU 42. When the level of the terminal T13 becomes "H," the transistor 48 is turned on and the LED 3 lights, and the "L" level signal as failure information is transferred to the failure monitor units 30 and 32 in the controllers 14 and 16. The LED 1 is connected in series with the resistor R1, and the LED 2 is connected in series with the resistor R2. Failure information from the failure monitor unit 26 in the power supply 12 is input to the terminal T15 via the path 40.

The failure monitor unit 26 includes an MPU 52, NPN transistors 54, 56, 58, and 60, and resistors R21-R28. The MPU 52 outputs an "H" level signal from the terminal T21 and an "L" level signal from the terminals T22 and T24 when the power supply 12 is in the normal status. The LED 4 lights when the terminal T21 becomes "H" level, and it is informed that the power supply 12 is in the normal status. Meanwhile, if a failure has occurred in the power supply 12, the MPU 52 switches the level of the terminal T21 to "L" and the level of the terminals T22 and T24 to "H." When the level of T21 becomes "H." the transistor 56 is turned on and the LED 3 lights, and an "L" level signal as failure information is transferred to the failure monitor units 30 and 32 in the controllers 14 and 16 via the path 36. When the level of the terminal T24 becomes "H." the transistor 60 is turned on and an "L" level signal as failure information is transferred to the failure monitor unit 24 in the power supply 10 via the path 40. Failure information about the power supply 10 is input from the failure monitor unit 24 to the terminal T25 via the path 38. If "L" level failure information is input to the terminal T25, the level of the terminal T23 is switched to "H" by the MPU 52. When the level of the terminal T23 becomes "H." the transistor 58 is turned on and the LED 1 lights, and "L" level failure information is transferred to the failure monitors 30 and 32 in the controllers 14 and 16 via the path 34. The LED 3 is connected in series with the resistor R3, and the LED 4 is connected in series with the resistor R4.

The failure monitor unit 30 in the controller 14 includes a LAN driver 62, main microprocessor 64, register 68 installed in an LSI (Large Scale Integrated Circuit) 66, buffers 70 and 72 that function as schmitt triggers, resistors R5-R8, diodes D3 and D4, and condensers C1 and C2. The failure monitor unit 32 in the controller 14 includes a LAN driver 74, main microprocessor 76, register 80 installed in an LSI 78, buffers 82 and 84 that function as schmitt triggers, resistors R9-R12, diodes D5 and D6, and condensers C3 and C4. The diode D3 in the controller 14 becomes conductive when the level of the path 34 becomes "L," and the diode D4 becomes conductive when the level of the path 36 becomes "L." When the diode D3 becomes conductive, a high-level pulse is output from the buffer 70 and is latched by the register 68. When the transistor D4 becomes conductive, a high-level pulse is output from the buffer 72 and latched by the register 68. In other words, an output pulse of the buffer 70 is latched by the resistor 68 if a failure has occurred in the power supply 10, and an output pulse of the buffer 72 is latched by the resistor 68 if a failure has occurred in the power supply 12. The main microprocessor 64 identifies the content of the register 68 by using register polling, and transmits, via the LAN driver 62, failure information indicating whether any failure has occurred in the power supply 10 or 12 to the maintenance PC 20, the monitor center 22, and the host computer/user terminal.

Meanwhile, the diode D5 in the controller 16 becomes conductive when the level of the path 36 becomes "L," and the diode D6 becomes conductive when the level of the path 34 becomes "L." When the diode D5 becomes conductive, a high-level trigger pulse is output from the buffer 82 and is latched by the register 80. When the diode D6 becomes conductive, a high-level trigger pulse is output from the buffer 84 and is latched by the register 80. The main microprocessor 76 identifies the content of the register 80 (the content of latch) by using register polling, and transmits, as the identification result, failure information indicating whether or not any failure has occurred in the power supply 10 or 12 to the maintenance PC 20, the failure monitor center 22, and the host computer/user terminal via the LAN driver 74.

Figure 3:
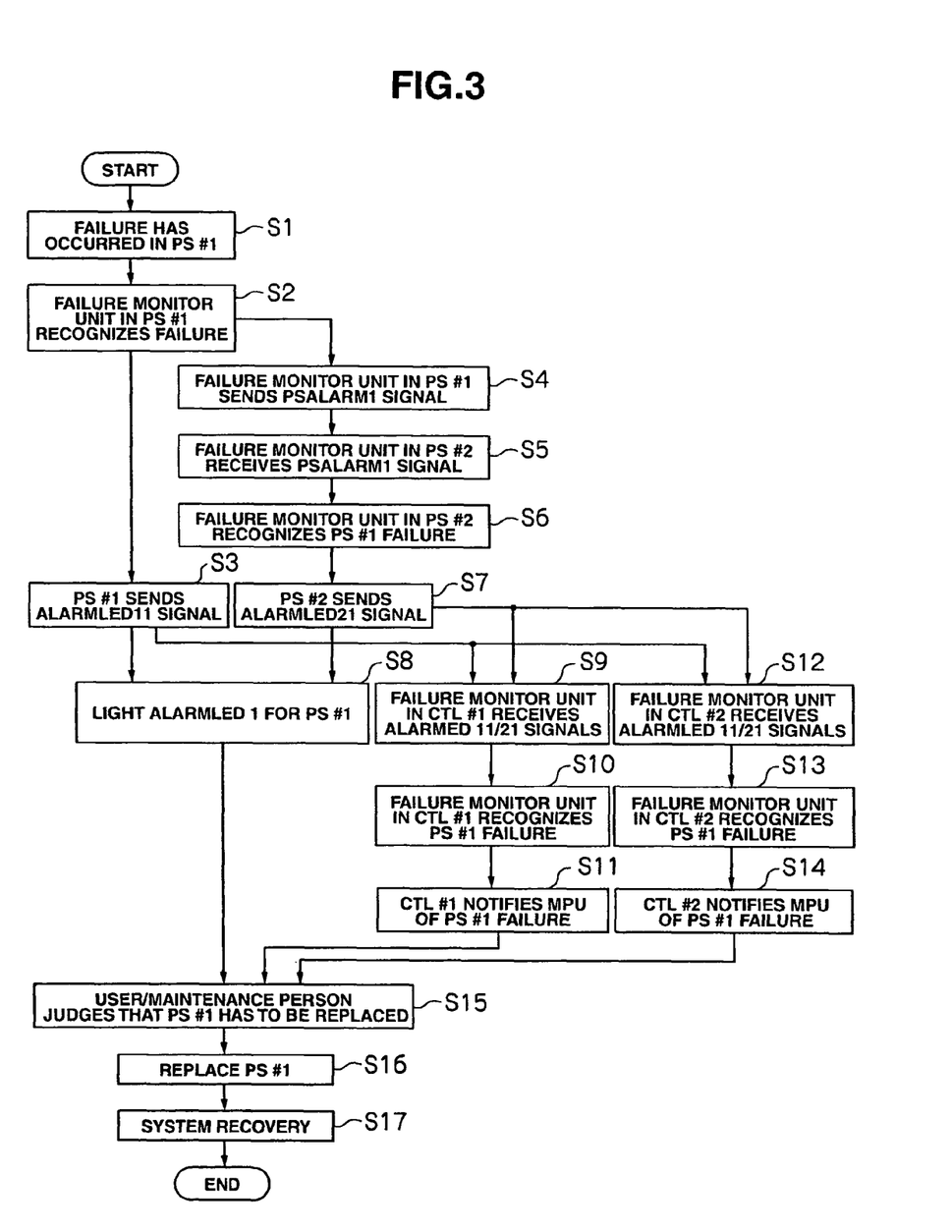
FIG. 3 is a flowchart illustrating a regular operation in the power supply failure monitoring device.

Next, the operation performed when a failure has occurred will be described with reference to the flowchart in FIG. 3. First, if a failure has occurred in the power supply 10 (S1), the failure monitor unit 24 in the power supply 10 recognizes the failure occurrence in the power supply 10 based on failure information collected from the power supply 10 (S2). The MPU 42 sets the level of the terminal T12 to "H" and outputs an ALARMLED 11 signal as "L" level failure information to the path 34 (S3). Also, the MPU 42 sets the level of the terminal T14 to "H" and outputs a PSALARAM 1 signal as "L" level failure information to the path 38 (S4). This signal is input, via the path 38, to the terminal T25 in the MPU 52 (S5). The MPU 52 recognizes the failure occurrence in the power supply 10 (S6), inverts the level of the terminal T23 to "H" and sends an ALARMLED 21 signal as "L" level failure information to the path 34 (S7). When the level of the path 34 becomes "L," the LED 1 lights (S8).

Meanwhile, when the level of the path 34 becomes "L," the failure monitor unit 30 in the controller 14 receives the ALARMLED 11/21 signal (S9), and the output pulse of the buffer 70 is latched by the register 78 (S9). The main microprocessor 64 recognizes the failure occurrence in the power supply 10 (S10) and notifies the maintenance PC 20, via the LAN driver 62, of the occurrence of a failure in the power supply 10 (S11). Moreover, when the level of the path 34 becomes "L," the failure monitor unit 32 in the controller 16 receives failure information in the form of an ALARMLED 11/21 signal, and the register 80 latches the output pulse of the buffer 84 (S12). The main microprocessor 76 recognizes the failure occurrence in the power supply 10 (S13) and notifies, via the LAN driver 74, the maintenance PC 20 of the failure occurrence in the power supply 10 (S14).

After the maintenance PC 20 is notified of the failure occurrence in the power supply 10, a user/maintenance person judges that the power supply 10 has to be replaced (S15), and replaces the power supply 10 (S6). After the power supply 10 is replaced, the system recovered its normal state (S17), and the processing according to this routine ends.

According to this embodiment, the failure monitor units 24 and 26 in the power supplies 10 and 12 can collect failure information about the power supplies 10 and 12 and control lighting of the LEDs 1 and 2. Therefore, if a failure has occurred in the failure information collection function for the power supplies 10 and 12 or the lighting control function for the LEDs 1 and 2, that failure can be removed by replacing the power supply 10, and controllers 14 and 16 do not have to be replaced. Moreover, the failure information can be sent to the host computer and the maintenance PC 20. Because the replacement of the controllers 14 and 16 is unnecessary, system freeze can be avoided.

Figure 4:
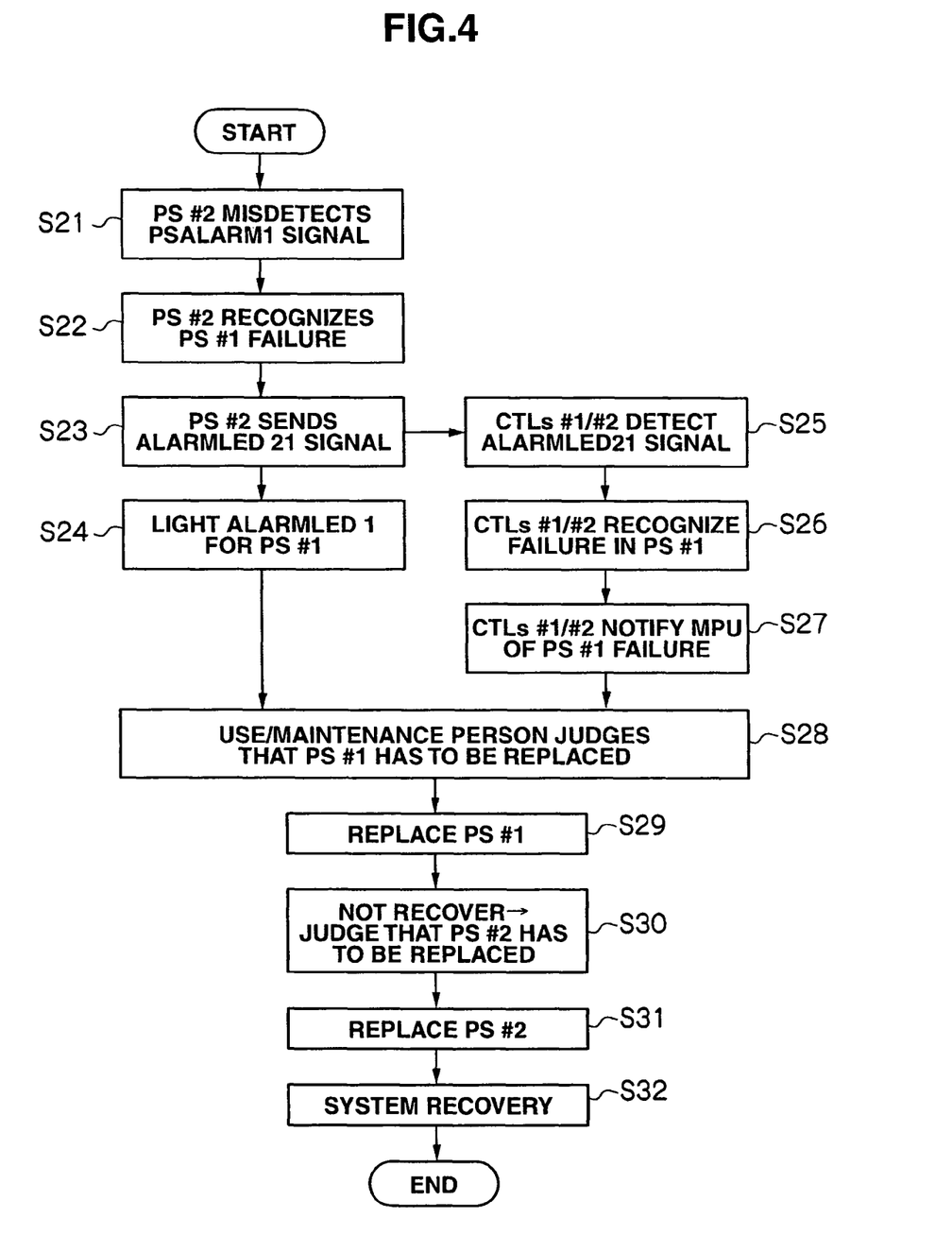
FIG. 4 is a flowchart illustrating the recovery operation procedure for PSALARM signal detection by mistake.

Next, the recovery operation procedure performed when a PSALARM signal has been detected by mistake will be described with reference to the flowchart in FIG. 4. First, assuming a PSALARM 1 signal as failure information is input to the failure monitor unit 26 in the power supply 12 via the path 38, if the MPU 52 detects the PSALARM 1 signal by mistake (S21), the MPU 52 recognizes failure occurrence in the power supply 10 (S22), sets the level of the terminal T23 to "H," and an ALARMLED 21 signal as "L" level failure information to the path 34 (S23). When the level of the path 34 becomes "L," the LED 21 lights (S24). Also, the failure monitor units 30 and 32 in the controllers 14 and 16 detect an ALARMLED 21 signal, and pulses output from the buffers 70 and 84 are latched respectively by the registers 68 and 80 (S25). The main microprocessors 64 and 76 recognize the failure occurrence in the power supply 10 by performing register polling on the registers 68 and 80 (S26) and notify, via the LAN drivers 62 and 74, the maintenance PC 20 of the failure occurrence in the power supply 10 (S27).

After the maintenance PC 20 is notified of the failure, a user/maintenance person judges that the power supply 10 has to be replaced (S28) and replaces the power supply 10 (S29). If the system does not recover after the power supply 10 is replaced, the user/maintenance person judges that the power supply 12 has to be replaced (S30) and replaces the power supply 12 (S31). If the failure monitor unit 26 was one that detected the PSALARM 1 signal by mistake, a new failure monitor unit 26 is provided in the power supply 12 by replacing the entire power supply 12. Accordingly, the power supplies 10 and 12 recover (S32), and the processing according to this routine ends.

According to this embodiment, even if the failure monitor unit 26 detected a PSALRAM 1 signal by mistake, the system can be recovered by replacing the power supplies 10 and 12.

Figure 5:
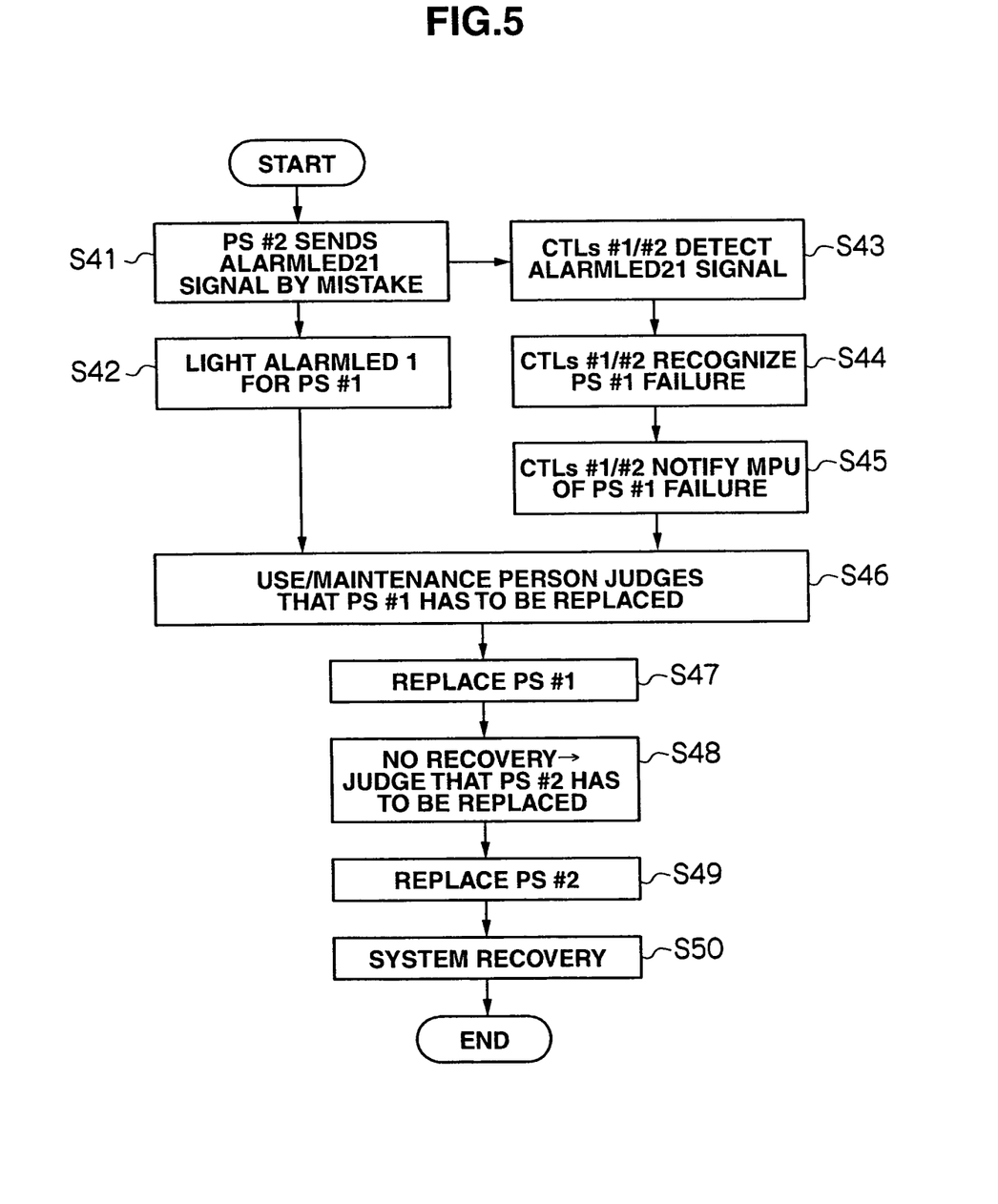
FIG. 5 is a flowchart illustrating the recovery operation procedure for ALARMLED signal detection by mistake.

Next, a recovery operation procedure performed when an ALARMLED signal has been detected by mistake will be described with reference to the flowchart in FIG. 5. First, if the failure monitor unit 26 in the power supply 12 sends an ALARMLED 21 signal by mistake to the path 34 because of a malfunction in the power supply 10 (S41), the level of the path 34 becomes "L" and the LED 1 lights (S42). The failure monitor units 30 and 32 in the controllers 14 and 16 detect the ALARMLED 21 signal, and output pulses from the buffers 70 and 84 are latched respectively by the registers 68 and 80 (S43). After that, the main microprocessors 64 and 76 identify the content of the registers 68 and 80 by using register polling, recognize the malfunction in the power supply 10 (S44), and notify, via the LAN drivers 62 and 74, the maintenance PC 20 of the malfunction in the power supply 10 (S45).

After the maintenance PC 20 is notified of the malfunction in the power supply 10, the user/maintenance person judges that the power supply 10 has to be replaced (S46) and replaces the power supply 10 (S47). If the system does not recover after the power supply 10 is replaced, the user/maintenance person judges that the power supply 12 has to be replaced (S48) and replaces the entire power supply 12 (S49). After replacing the entire power supply 12, a new failure monitor unit 26 monitors the power supply 12. Accordingly, both the power supplies 10 and 12 recover (S50), and the processing according to this routine ends.

If the above described failure occurs, the failure is not found until a user/maintenance person finds the LED lighting, or even if the failure is found, the controller has to be replaced in the conventional technique. On the other hand, according to this embodiment, the failure can be removed only by replacing the power supply 10 and/or 12, and the controllers 14 and/or 16 do not have to be replaced. Moreover, the failure information can be sent to the host computer or maintenance PC 20 with certainty.

Figure 6:
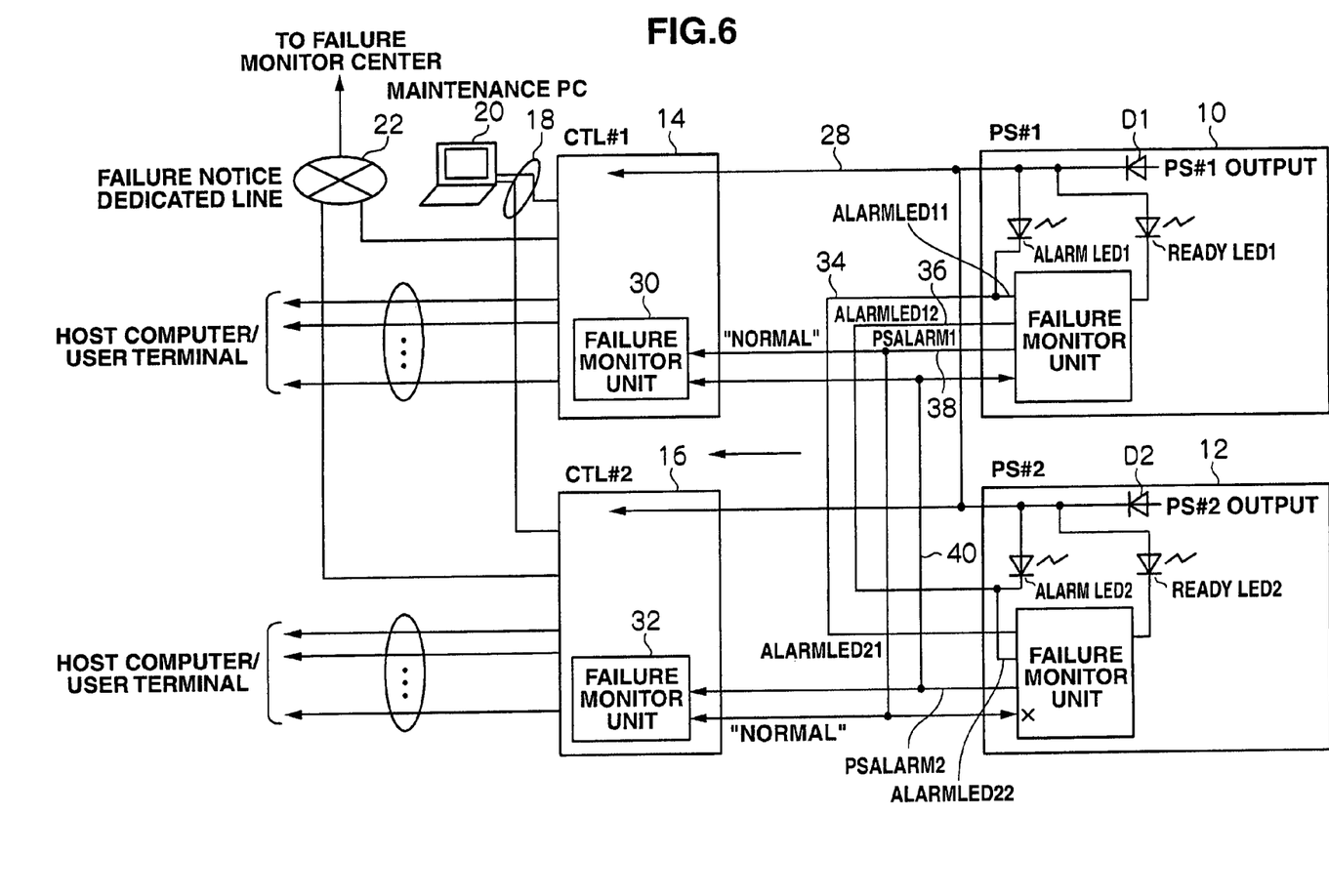
FIG. 6 is a block diagram illustrating the configuration when the controller receives a PSALARM signal.

If, as shown in FIG. 6, the paths 34 and 36 connect the failure monitor units 24 and 26 mutually, the paths 38 and 40 connect not only the failure monitor units 24 and 26 mutually, but also the failure monitor units 30 and 32, and the failure monitor unit 26 in the power supply 12 has detected a PSALARM 1 signal by mistake, the failure monitor units 30 and 32 recognize that the PSALARM 1 signal is normal although the failure monitor unit 26 recognizes the malfunction in the power supply 10. Therefore, the failure monitor units 30 and 32 in the controllers 14 and 16 do not recognize the malfunction in the power supply 10. Accordingly, while the failure monitor unit 26 lights the LED 1, but the failure monitor units 30 and 32 do not notify the maintenance PC 20 of the malfunction. In that case, the user/maintenance person cannot realize, until they find the LED 1 lighting, that the failure monitor unit 25 has detected the PSALARM signal by mistake. Accordingly, in the present invention, an ALARMLED signal is used also as a signal for collecting power supply failure information, and a PSALARM signal is used between the failure monitor units 24 and 26.

Figure 7:
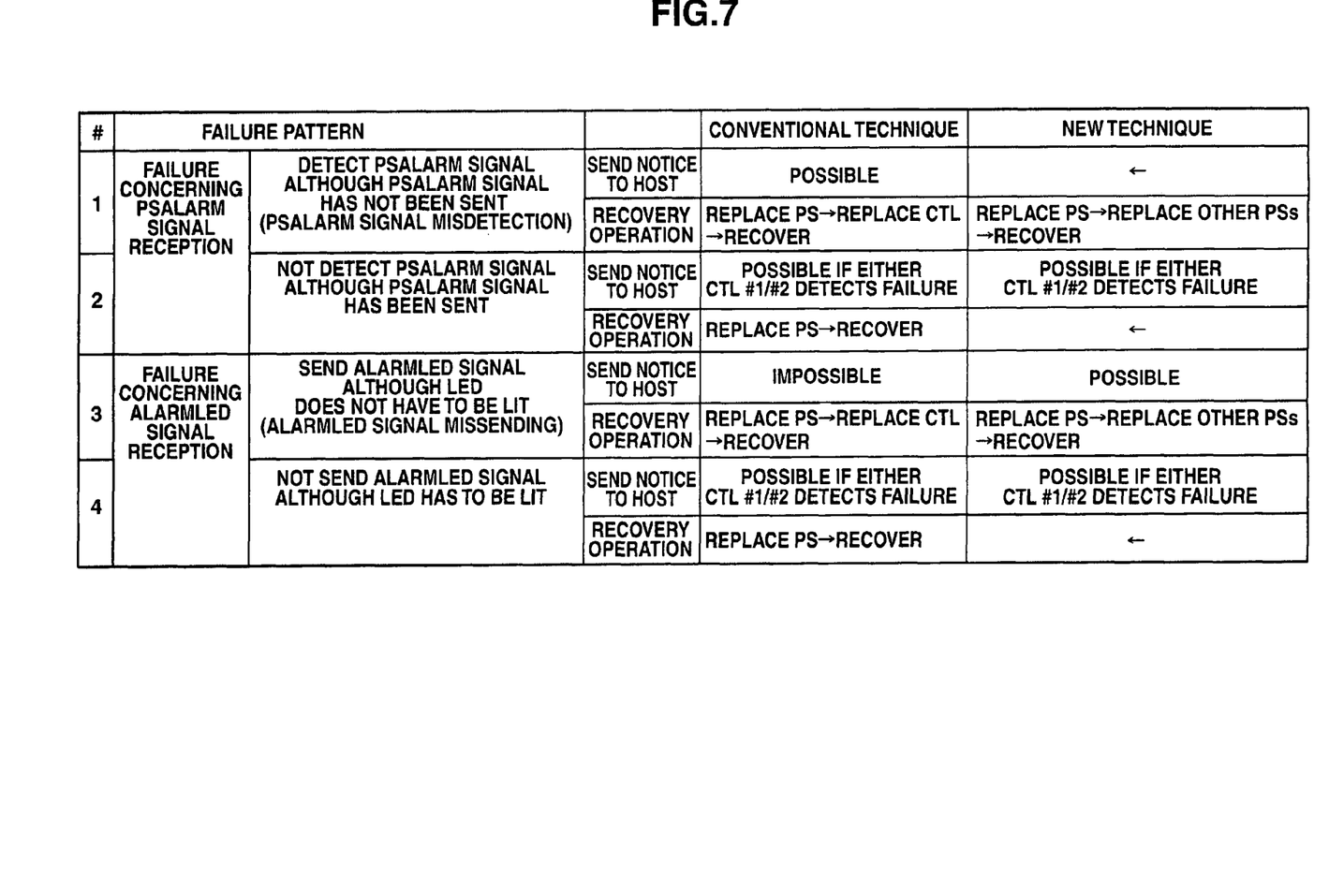
FIG. 7 is a diagram illustrating the respective advantages brought about by the conventional technique and the present invention.

Comparing the failure recovery procedure in the respective failure patterns with the conventional techniques as shown in FIG. 7, if a failure concerning PSALARM signal reception occurs and the PSALARM signal has been detected by mistake, the controllers have to be replaced to recover the system in the conventional technique. Meanwhile, the system can be recovered by replacing the power supplies in the present invention. If a PSALARM signal is sent but is not detected, in the conventional technique the failure notice can be sent to a host computer if either of the controllers detects the failure; meanwhile, in the present invention, the failure notice can be sent if either of the failure monitor units 24 and 26 detects the failure. In that case, the system can be recovered by replacing the power supplies in both the conventional technique and the present invention.

If a failure concerning ALARMLED signal transmission occurs and the ALARMLED signal is sent by mistake, the failure notice cannot be sent to the host computer, and the system cannot be recovered until the power supplies and controllers are replaced in the conventional techniques. Meanwhile, in the present invention, the failure notice can be sent to the host computer and the system can be recovered by replacing at least the power supply in which a failure has occurred. If a LED has to be lit but an ALARMLED signal cannot be sent, the notice can be sent to the host computer if either of the controllers detects the failure in the conventional technique. Meanwhile, in the present invention, the notice can be sent to the host computer if either the failure monitor unit 24 or 26 detects the failure. During recovery, the system can be recovered by replacing power supplies in both the conventional technique and the present invention.

Figure 8:
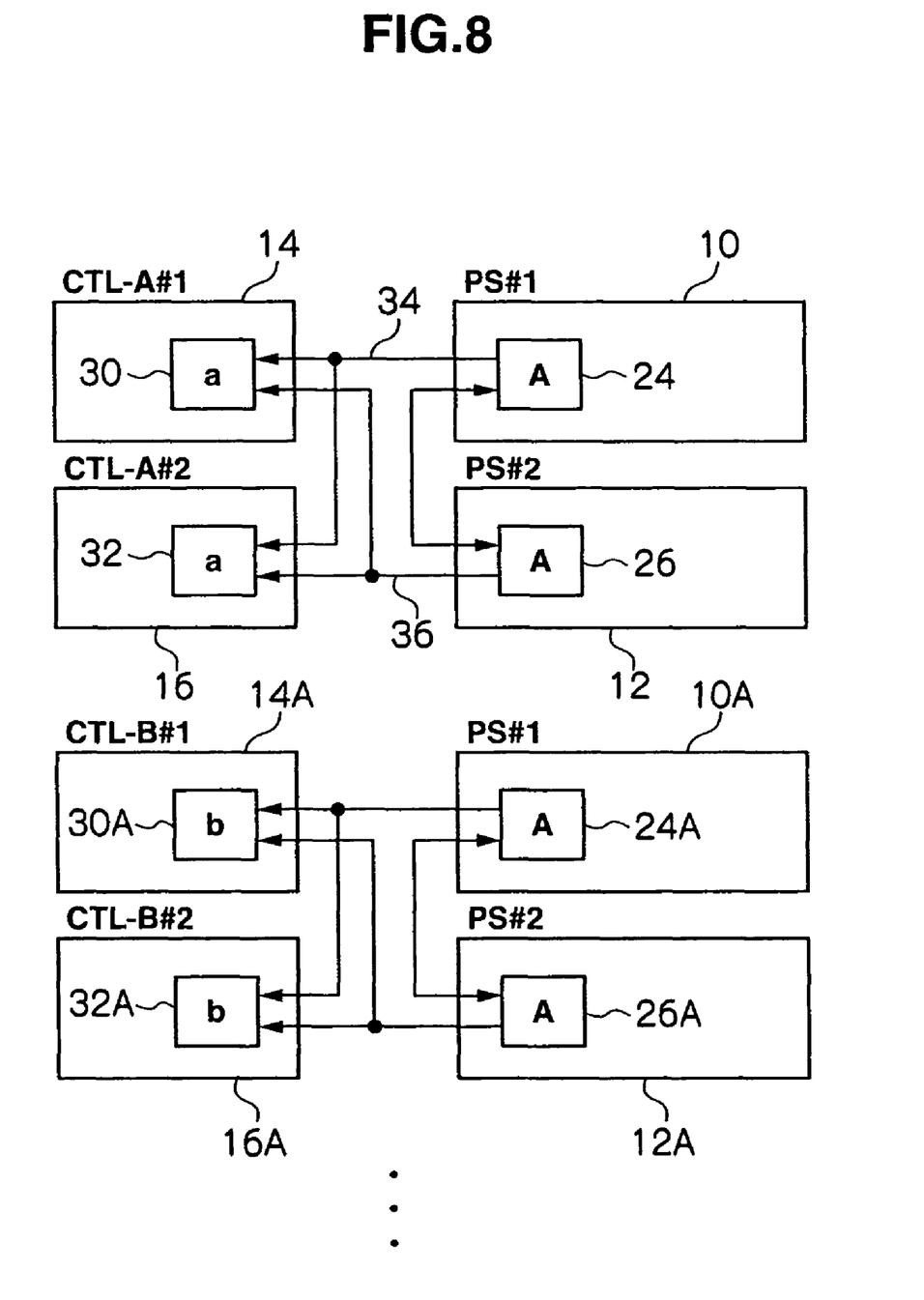
FIG. 8 is a diagram illustrating an interface function performed for a power supply failure occurrence.

In this embodiment, the failure monitor units 24 and 26 in the power supplies 10 and 12 can collect failure information about the power supplies 10 and 12 and control lighting of the LEDs 1 and 2. Accordingly, as shown in FIG. 8, the operations performed for driving the LEDs 1 and 2 and sharing power supply failure information can be completed within the power supplies 10 and 12. Between the power supplies 10 and 12 and the controllers 14 and 15 exist only interfaces for sending a failure information notice from the power supplies 10 and 12 to the controllers 14 and 16, and so the interface for each controller 14 and 16 is a simple "a" interface only for receiving failure information. Therefore, the special preparation required in the conventional technique is not necessary in the present invention. Accordingly, even if the present invention is applied to the same power supplies 10A and 12A as the power supplies 10 and 12 and the controllers 14A and 16A are provided for the power supplies 10A and 12A respectively, special preparation for the controllers 14A and 16A is not necessary and a simple "b" interface only for receiving failure notices is used. Accordingly, by using the configuration according to the present invention, the number of components in the controllers 14,16, 14A, and 16A can be reduced, and if only a single power supply is used for the controllers 14 and 16, the design workload can be reduced.

According to the present embodiment, the interfaces between the power supplies 10 and 12 and the controllers 14 and 16 are simplified, and accordingly the number of connector pins in the controllers 14 and 16 and wires between the controllers 14 and 16 and the power supplies 10 and 12 can be reduced. In other words, a connector having a number of pins is necessary between the controllers 14 and 16 and a backboard so that the controllers 14 and 16 can exchange data or failure information with other components such as other controllers, hard disks, or the power supplies 10 and 12. However, a connector neck can be avoided by reducing the number of connector pins. Regarding the number of wires between the controllers 14 and 16 and the power supplies 10 and 12, patterns can be reduced if the controllers 14 and 16 and the power supplies 10 and 12 are mutually connected on the same board. If cables exist between the controllers 14 and 16 and the power supplies 10 and 12, the number of cores in the cables can be reduced.

Figure 9:
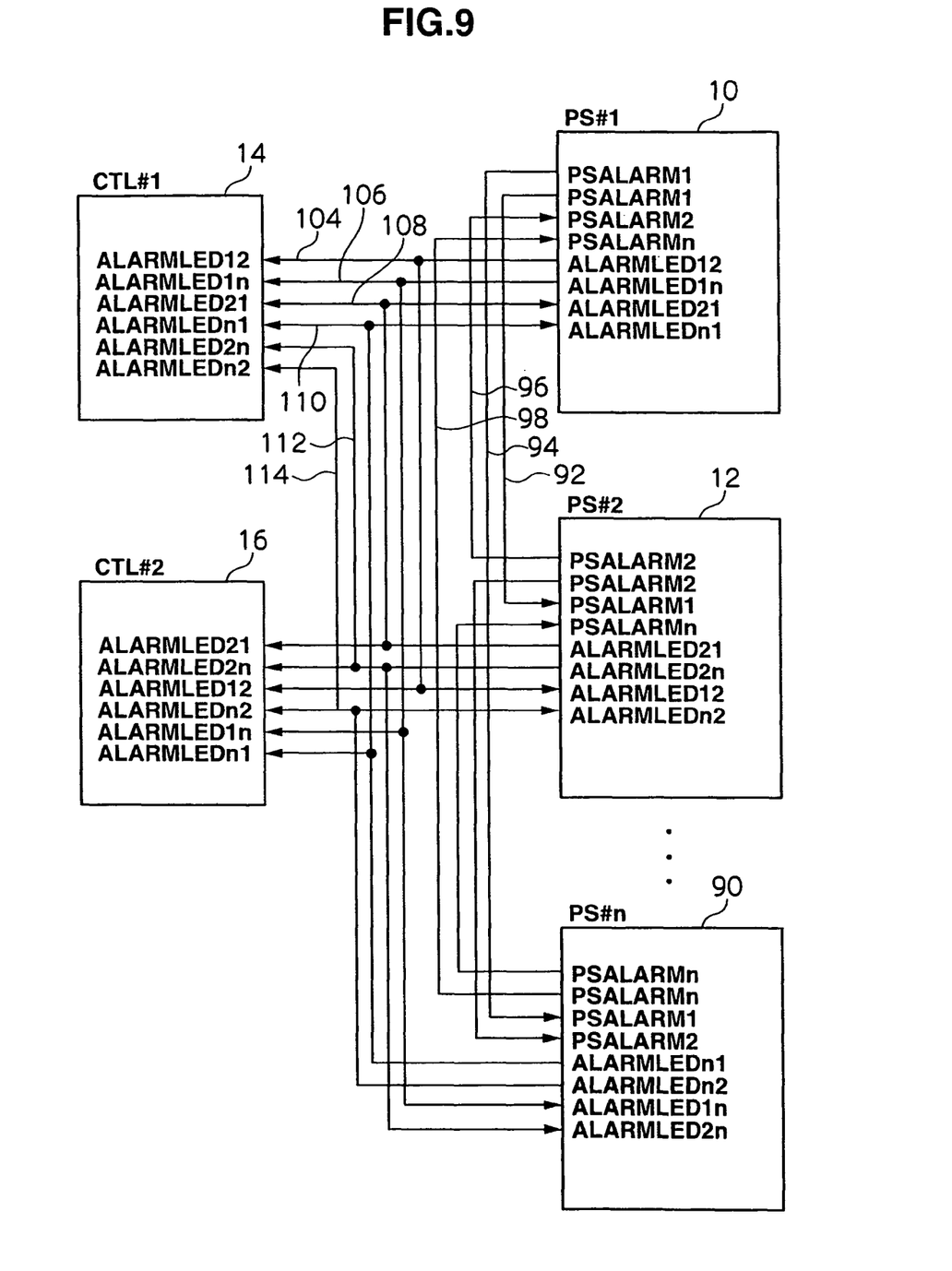
FIG. 9 is a block diagram illustrating the relationship between the controllers and the power supplies when the number of power supplies is three or more.

Next, an embodiment in which the number of power supplies is three or more will be described with reference to FIG. 9. If an $n^{th}$ (n being an integer of three or more) power supply 90 other than the power supplies 10 and 12 is provided, the power supplies 10, 12, and 90 are mutually connected by paths 92 to 102 for sending PSALARM 1-n signals, and the controllers 14 and 16 are connected to the power supplies 10, 12, and 90 by paths 104 to 114 for sending ALARMLED 12-n1, 21-n2, n1-2n signals.

Figure 10:
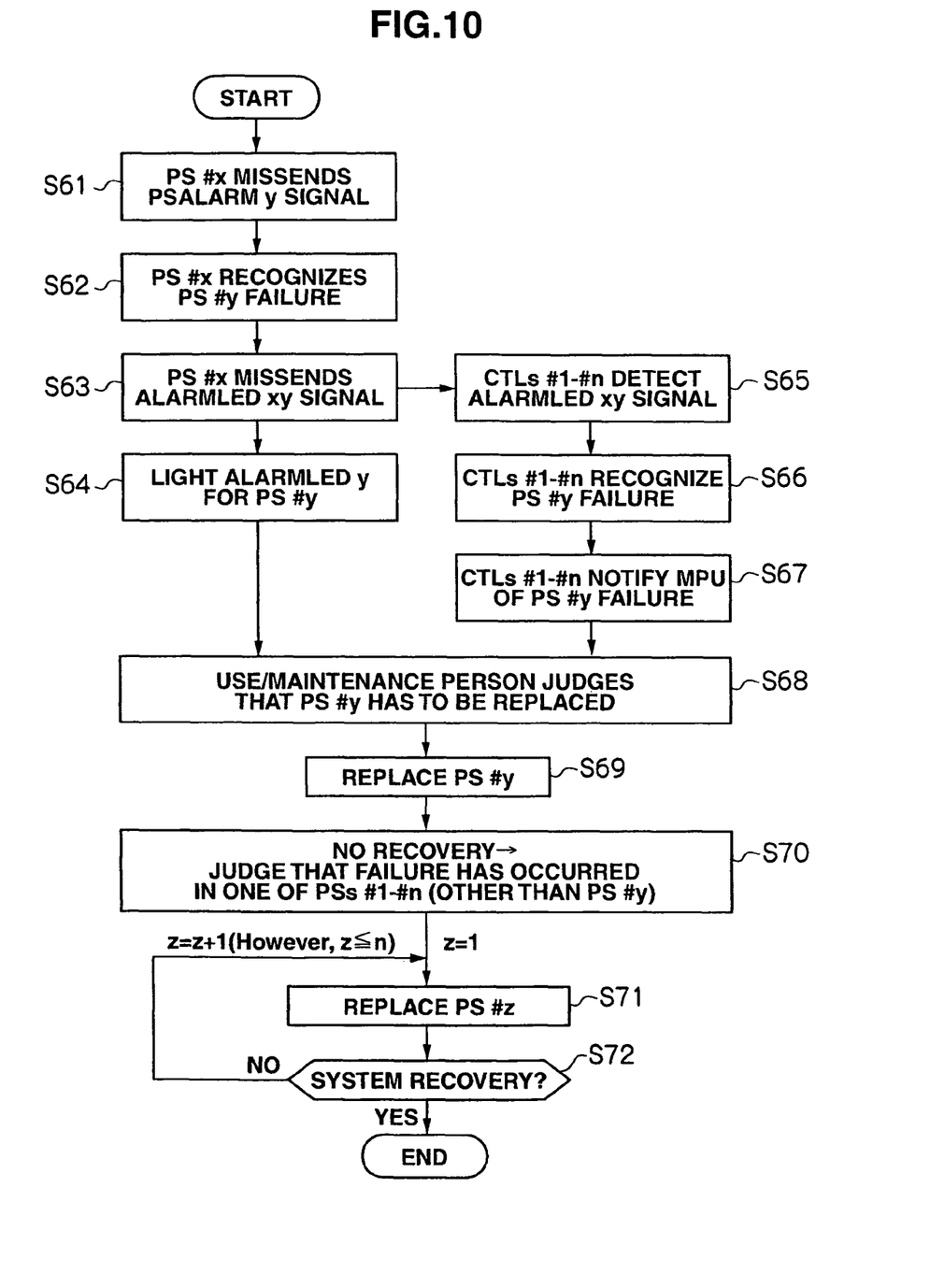
FIG. 10 is a flowchart illustrating an operation performed when any of three or more power supplies has detected a PSALARM signal by mistake.

Next, the processing performed when a PSALARM signal is detected by mistake in this embodiment will be described with reference to the flowchart in FIG. 10. First, when the failure monitor unit in the power supply 90 detects a PSALARM y signal by mistake (S61), the failure monitor unit in the power supply 90 recognizes the malfunction in the power supply #y (S62) and sends an ALARMLED xy signal (S63). Thus the LED that responds to the power supply #y lights (S64). The controllers 14 and 16 detect the ALARMLED xy signal (S65), and output pulses corresponding to the power supply #y are latched by the registers 68 and 80. As a result, the main microprocessors 64 and 76 in the controllers 14 and 16 recognize the malfunction in the power supply #y (S66) and notify the maintenance PC 20 of the malfunction in the power supply #y (S67).

After the maintenance PC 20 is notified of the malfunction, a user/maintenance person judges that the power supply #y has to be replaced (S68) and replaces the power supply #y (S69). If the system does not recover even after the replacement of the power supply #y, the user/maintenance person judges that the failure is occurring in another power supply (S70) and replaces a power supply other than the power supply #y (S71). The user/maintenance person judges whether or not the system has recovered after every time the power supply is replaced (S72), and the remaining power supplies are sequentially replaced until the system recovers. If the system recovers after sequentially replacing the remaining power supplies, the processing according to this routine ends.

According to this embodiment, if the number of power supplies is three or more, the number of interfaces for each one of the controllers 14 and 16 is 2n in the conventional technique, but the number is n(n-1) in the present embodiment. The number of interfaces for each one of the power supplies 10, 12, and 90 is three in the conventional technique, but the number is 4(n-1) in the present embodiment.

Figure 11:
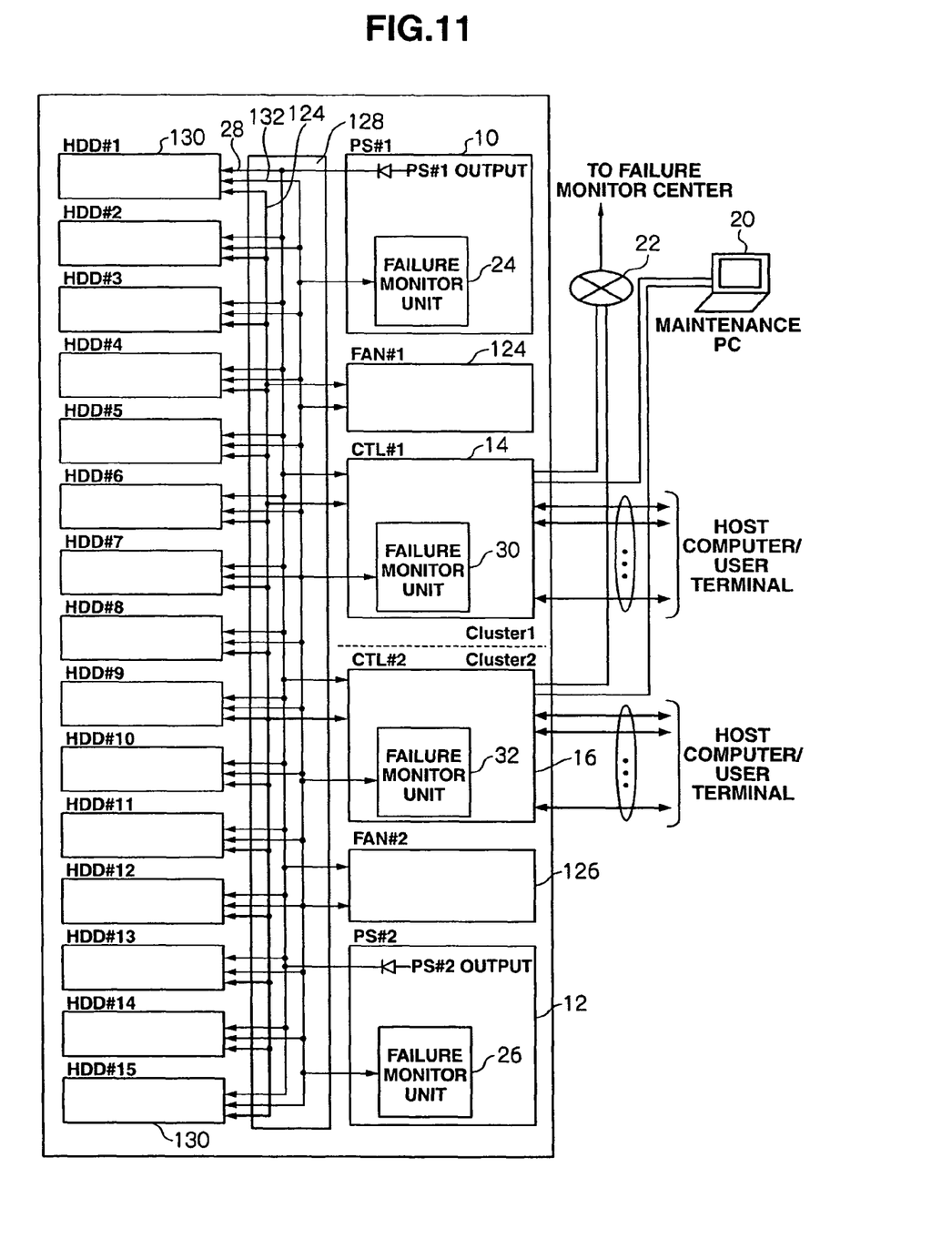

An embodiment in which the present invention is applied to a storage system is shown in FIG. 11. The storage system is divided into clusters #1 (120) and #2 (122). The cluster #1 (120) includes a power supply 10, controller 14, and fan #1 (124). The cluster #2 (122) includes a power supply 12, controller 14, and fan #2 (126). A power supply line 28, being an output line of the power supplies 10 and 12, is connected to the hard disk drives (HDDs) #1-#15 (130). The failure monitor units 24 and 26 in the power supplies 10 and 12 and the failure monitor units 30 and 32 in the controllers 14 and 16 are connected to the HDDs #1-#15 (130) via a path 132 for transferring failure information. The HDDs #1-#15 (130) are connected mutually via a path 134 for transferring user data, and are also connected to the failure monitor units 30 and 32 via the path 134. The paths 132 and 134 are provided with the power supply line 28 on a backboard 128.

According to this embodiment, the failure monitor units 24 and 25 in the power supplies 10 and 12 can collect failure information about the power supplies 10 and 12 and control lighting of the LEDs 1 and 2. Accordingly, even if a failure occurs in the failure information collection function for the power supplies 10 and 12 or the lighting control function for the LEDs 1 and 2, the system can be recovered only by replacing the power supply 10 and/or 12. The controllers 14 and/or 16 do not have to be replaced, and failure information can be sent to the host computer and/or the maintenance PC 20.

Figure 12:
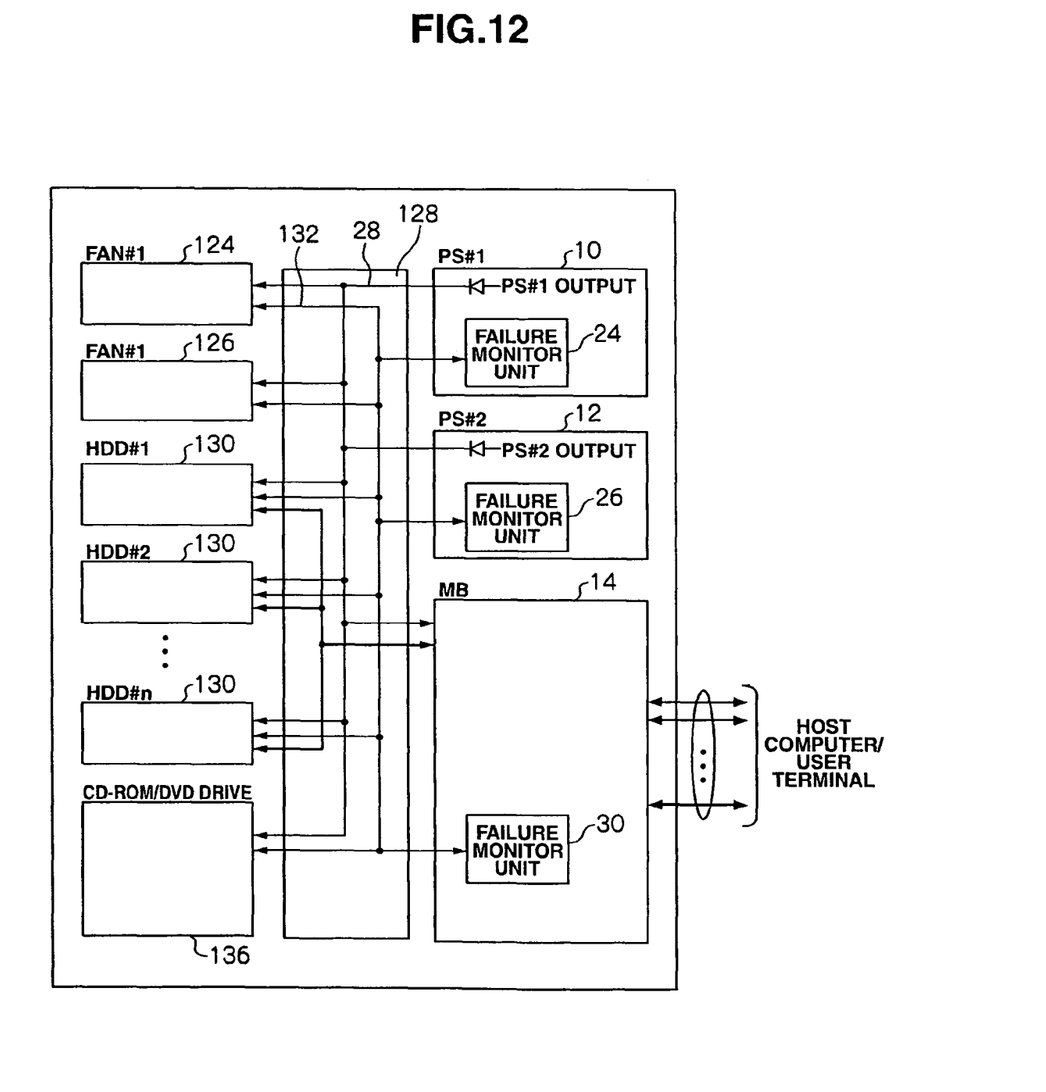

Next, an embodiment in which the present invention is applied to a server will be described with reference to FIG. 12. A server includes two power supplies 10 and 12, a controller 14, a fan #1 (124), a fan #2 (126), HDDs #1-#n (130), a backboard 128, and a CD-ROM/DVD drive 136. A power supply line 28, being a common output line for the power supplies 10 and 12, is connected, via the backboard 128, to the fans 124 and 126, HDDs #1-#2 (130), and CD-ROM/DVD drive 136. A path 132 for transferring failure information is connected to the failure monitor units 24, 26, and 30, fans 124 and 126, HDDs #1-#n (130), and CD-ROM/DVD drive 136. A path 134 for transferring user data is connected to the HDDs #1-#n (130) and the controller 14.

According to this embodiment, the failure monitor units 24 and 26 in the power supplies 10 and 12 can collect failure information about the power supplies 10 and 12 and control lighting of the LEDs 1 and 2. Accordingly, even if a failure occurs in the failure information collection function for the power supplies 10 and 12 or the lighting control function for the LEDs 1 and 2, the system can be recovered only by replacing the power supply 10 and/or 12, and the failure information can be sent to a host computer and the maintenance PC 20.

What is claimed is:

1. A storage system comprising:
 a plurality of storage devices for storing data to be used by a host computer;
 a controller for controlling to write data into at least one of the plurality of storage devices or to read data from at least one of the plurality of storage devices;
 a first power supply unit supplying power to the plurality of storage devices redundantly and comprising a first failure monitor circuit for monitoring a state of the first power supply unit and collecting a first failure information from the first power supply unit, and a first light emitting element for indicating failure occurred in the first power supply unit; and
 a second power supply unit supplying power to the plurality of storage devices and comprising a second failure monitor circuit for monitoring a state of the second power supply unit and collecting a second failure information from the second power supply unit, and a second light emitting element for indicating failure occurred in the second power supply unit,
 wherein, if the a first failure monitor circuit recognizes failure occurred in the first power supply unit by using the collected first failure information, the first failure monitor transfers the collected first failure information of the first power supply unit to the controller and the second failure monitor circuit,
 wherein the second failure monitor circuit receives the collected first failure information from the first failure monitor circuit, and transfers the received first failure information to the controller, and controls to light the first light emitting element in the first power supply unit, wherein the controller determines whether a failure is occurred or not based on the first failure information received from both the first and the second failure monitor circuits, and transfers a result of determination to the host computer, wherein the first power supply unit is adapted to be replaced based on the result of the determination.

2. The storage system according to claim 1, wherein the first failure monitor circuit is connected to a first path for transferring the collected first failure information to the second failure monitor circuit, a second path for transferring the collected first failure information to the controller.

3. The storage system according to claim 1, wherein the first power supply unit is adapted to be replaced, if the first failure information of the first power supply unit received from both the first failure monitor circuit and the second failure monitor circuit show that the failure is occurred in the first power supply unit.

4. The storage system according to claim 1, wherein the second power supply unit is adapted to be replaced, if the first failure information of the first power supply unit received from the second failure monitor circuit is sent by mistake.

5. The storage system according to claim 1, wherein the first power supply unit is adapted to be replaced, if the first failure monitor circuit controls lighting of the second light emitting element arranged to respond to the second failure monitor circuit by mistake.

* * * * *